(12) United States Patent
Landrock et al.

(10) Patent No.: US 8,077,866 B2
(45) Date of Patent: Dec. 13, 2011

(54) PROTECTING AGAINST SECURITY ATTACK

(75) Inventors: Peter Landrock, Cambridge (GB); Jan Ulrik Kjaersgaard, Aarhus N (DK)

(73) Assignee: Cambridge Silicon Radio Limited, Cambridge (GB)

( * ) Notice: Subject to any disclaimer, the term of this patent is extended or adjusted under 35 U.S.C. 154(b) by 783 days.

(21) Appl. No.: 12/104,196

(22) Filed: Apr. 16, 2008

(65) Prior Publication Data

US 2009/0214027 A1 Aug. 27, 2009

(30) Foreign Application Priority Data

Feb. 22, 2008 (GB) .................................. 0803320.1
Apr. 9, 2008 (GB) .................................. 0806439.6

(51) Int. Cl.
*H04L 9/00* (2006.01)
*H04L 9/32* (2006.01)
*G06F 12/14* (2006.01)

(52) U.S. Cl. ................ 380/30; 380/28; 380/29; 726/27; 726/28; 726/29; 726/30; 713/189; 713/190; 713/191; 713/192; 713/194

(58) Field of Classification Search .................... 380/30
See application file for complete search history.

(56) References Cited

U.S. PATENT DOCUMENTS

2004/0010689 A1 * 1/2004 Vanstone et al. .............. 713/171
2004/0114760 A1 6/2004 Brown

OTHER PUBLICATIONS

Antipa et al: "Validation of Elliptic Curve Public Keys" Lecture Notes in Computer Science, Springer Verlag, Berlin; Germany, vol. 2567, Jan. 6, 2003, pp. 221-223, XP002366140 ISSN: 0302-9743.
International Search Report dated Jul. 29, 2009, for PCT/EP2009/052089.
Written Opinion of the International Searching Authority for PCT/EP2009/052089.

* cited by examiner

*Primary Examiner* — Longbit Chai
(74) *Attorney, Agent, or Firm* — Greenberg Traurig, LLP

(57) ABSTRACT

A communication device having a private key and configured to implement an elliptic curve security mechanism for successful operation of which it: (a) receives a first value from another device, (b) computes a second value as the scalar multiplication of the first value with its private key and (c) returns that second value for use by the other device; the mechanism being such that the first value defines a pair of coordinates representing a first point and the second value defines a pair of coordinates representing a second point and being such that the first value is valid only if it lies on an elliptic curve of predefined form; the device being configured to implement the mechanism by the steps of: receiving data as the first value; making a first evaluation as to whether the first value is a singular point with respect to the elliptic curve; computing the second value as the scalar multiplication of the first value with the private key; making a second evaluation as to whether the second value lies on the elliptic curve; and returning the second value only if the first evaluation is false and the second evaluation is true.

13 Claims, 1 Drawing Sheet

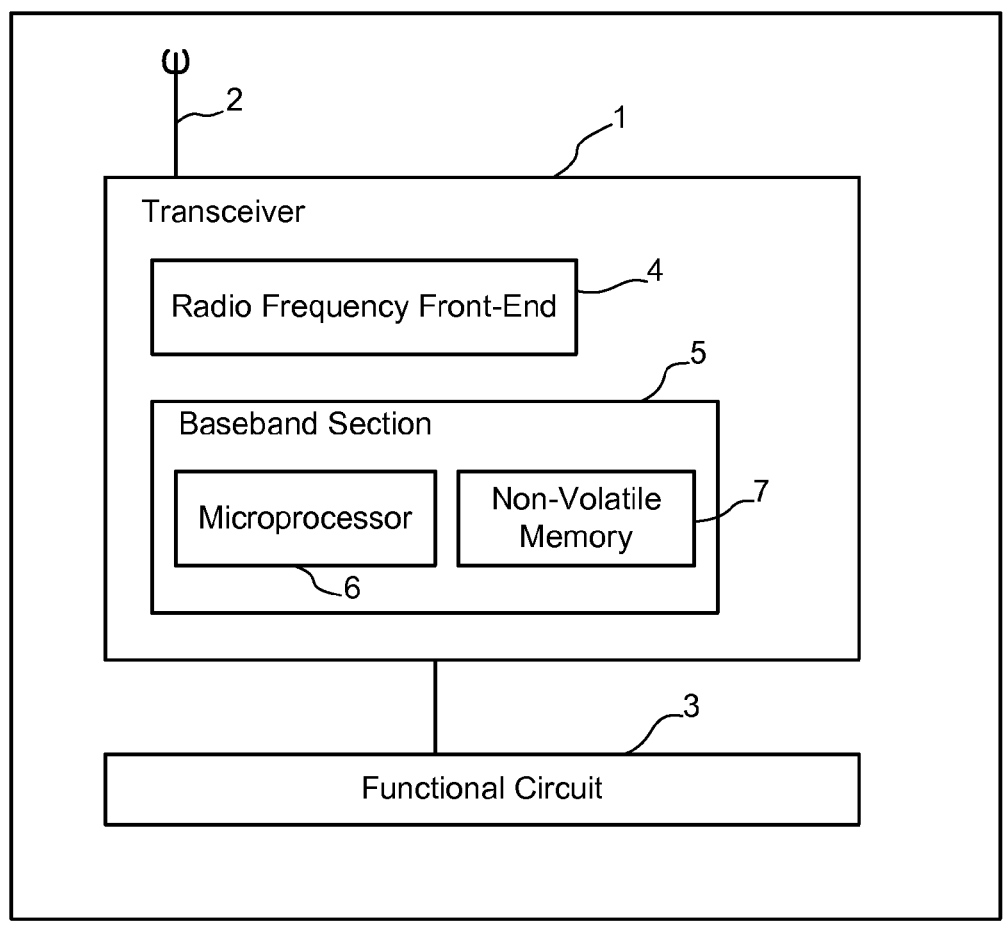

PROTECTING AGAINST SECURITY ATTACK

RELATED APPLICATIONS

This application claims priority to United Kingdom Application No. GB 0803320.1, filed 22 Feb. 2008 (title: PROTECTING AGAINST SECURITY ATTACK; applicant: Cambridge Silicon Radio Limited), which is incorporated by reference herein, and to 'United Kingdom Application No. GB 0806439.6. filed 9 Apr. 2008 (title: PROTECTING AGAINST SECURITY ATTACK).

FIELD OF THE DISCLOSURE

This disclosure relates to protecting devices and data against security attack.

BACKGROUND

Bluetooth is a wireless protocol intended for short-range communication between devices. One aspect of the Bluetooth protocol is the Bluetooth Secure Simple Pairing (BT-SSP) protocol. The BT-SSP is intended to provide a secure mechanism for pairing between two Bluetooth devices. According to the protocol each device has a public-private key pair. In the first step of the BT-SSP protocol the devices exchange their public keys. Then each device computes its own Diffie-Hellman key (DHKey) as a function of its private key and the other device's public key. That DHKey is then used to compute a so-called MAC Ea value that is sent to the other device in the ninth step of the BT-SSP protocol. Crucial to the protocol is that the private key of any device must be kept secret. Otherwise, the device could be vulnerable to attack.

The BT-SSP protocol uses an elliptic curve Diffie-Hellman (ECDH) algorithm. The elliptic curve E used in the protocol can be expressed by its parameters as $E=(a,b,p,r)$. The curve is defined over the integers modulo p (which will be denoted Zp herein) with $\Gamma$ points on the curve, the points being given by the equation $y^2=x^3+ax+b$, where p and r are both primes.

In September 2006 an attack against the BT-SSP protocol known as the "invalid curve attack" came to light. The invalid curve attack is intended to reveal the private key of a Bluetooth device. The attack operates as follows.

Suppose an attacker wants to use a device B to attack a device A and discover the private key of device A. The attacker selects an invalid public key composed of data that constitutes the coordinates of a point lying on an invalid curve (i.e. a curve that does not satisfy the conditions detailed above for E) with smaller order. The attacker then configures device B to use that key for executing the ECDH part of the BT-SSP protocol with device A. In accordance with the BT-SSP protocol, device A computes a DHKey using an invalid point (PKb) received from B and its own private key (SKa), and then uses that DHKey in order to calculate the Ea in step 9 of the BT-SSP protocol and sends that Ea to device B. Once the attacker knows that Ea, and with knowledge of the invalid public key PKb that was used in generating it B can recover a part of the private key SKa of A. By repeating this procedure, B can eventually recover the full private key of A using the Chinese Remainder Theorem.

Once an attacker knows the private key SKa used for ECDH of a device A, it may be possible for the attacker to derive all further link keys used by A. This is because the Bluetooth specification has not required device A to refresh its ECDH key pair. [See the Bluetooth 2.1+EDR core specification, $26^{th}$ Jul. 2007, Vol. 2 part H 7.1 Phase 1: Public Key Exchange"]. This means that an attacker who knows SKa, can—assuming SKa has not been refreshed by device A—compute any further DHKey. This extends even to DHKeys used for communication with third devices because their public keys (PKb) will be communicated to device A in clear text. From this the attacker can also compute the link key LK because all the other input parameters to the function f2 used in phase 4 of the BT-SSP protocol (nonces and BD_ADDR device addresses) are also passed in clear text.

Three options have been proposed to allow a device to protect its private key against attacks that use invalid public keys. Those are:

1. The invalid curve attack is not practically feasible when the attacked device (A) frequently refreshes its private ECDH key SKa. Therefore, to protect against the attack the device could change its private key after a number of successful or failed attempts to pair from any single BD_ADDR device address, or at some other relatively frequent interval. This approach has some drawbacks. First, one of the authentication mechanisms provided for in the BT-SSP protocol uses data transferred out of band (i.e. other than via Bluetooth), for example by near field communication (NFC). Some of the information that is exchanged out of band is a function of the private key. An example of this configuration is a Bluetooth headset that incorporates a passive NFC tag that is static (i.e. its content cannot be changed) and programmed in the factory when the headset is made. This tag is then used to introduce and secure the link between a headset and phone. If the headset were to change its keys at any point after the tag has been created (as would be involved if it implemented this first method of protection from the invalid curve attack) then the NFC tag would subsequently be useless. Second, this method of protection requires persistent counters to be kept in memory, for example in flash or EEPROM. Both of these memory technologies have a limited number of guaranteed writes. This could lead to an attack on a device which shortens its life. This could be solved by using a different key for every pairing attempt, but this would be costly in CPU time.

2. The invalid curve attack relies on the injection of an invalid public key as input for device A to compute its DHKey. Therefore, the device could verify that any received public key on the basis of which it is requested to compute a DHKey lies on the correct curve, and if it does not then the device could reject that request. One way to check the validity of a public key Q received from another device is as follows:

a. verify that the input point represented by Q is not equal to the point at infinity;

b. verify that the x and y coordinates represented by Q are properly represented elements of the field;

c. verify that Q lies on the valid elliptic curve.

If any of these tests is not satisfied then the device A rejects the request to generate a DHKey. Techniques of this nature are discussed in WO 99/20020, U.S. Pat. Nos. 6,563,928, 5,933, 504, EP 0 743 774 and EP 1 025 672.

3. The device could implement elliptic curve point addition and doubling by means of mechanisms that are valid only on the correct curve so that an error automatically arises if the device tries to compute a DHKey from an public key that lies on an invalid curve.

Further mechanisms to protect against the invalid curve attack, and potentially other similar attacks, would be desirable since they could increase security and could be more efficient than the existing mechanisms.

BRIEF DESCRIPTION OF THE DRAWING

The present disclosure will now be described by way of example with reference to the accompanying drawing, in which:

The sole FIGURE is a schematic diagram of a Bluetooth-enabled device.

DETAILED DESCRIPTION

According to one aspect of the present disclosure, there is provided a communication device having a private key and configured to implement an elliptic curve security mechanism for successful operation of which it: (a) receives a first value from another device, (b) computes a second value as the scalar multiplication of the first value with its private key and (c) returns that second value for use by the other device; the mechanism being such that the first value defines a pair of coordinates representing a first point and the second value defines a pair of coordinates representing a second point and being such that the first value is valid only if it lies on an elliptic curve of predefined form; the device being configured to implement the mechanism by the steps of: receiving data as the first value; making a first evaluation as to whether the first value is a singular point with respect to the elliptic curve; computing the second value as the scalar multiplication of the first value with its private key; making a second evaluation as to whether the second value lies on the elliptic curve; and returning the second value only if the first evaluation is false and the second evaluation is true.

The security mechanism may be such that the elliptic curve is defined over the integers modulo a predetermined prime number. The device may be configured to make a third evaluation as to whether both of the coordinates defined by the first value lie in the range from zero to the predetermined prime number, and the returning step may comprise returning the second value only if additionally to the said conditions the third evaluation is true.

The step of computing the second value preferably comprises computing the second value as the scalar multiplication of the first value with the private key of the device, the coordinate calculations for that multiplication being performed modulo the predetermined prime number.

The device may store a private key that it keeps constant for use in multiple iterations of the mechanism. The private key may be kept constant for the lifetime of the device. It may be stored in the device at the time of manufacture. The device may be incapable of changing the private key. Alternatively, the device may be arranged to generate the private key randomly for use in conjunction with a single received first value rather than using a pre-stored private key.

The device may be configured so as not to directly evaluate whether the received first value lies on the elliptic curve.

The device may be configured to make a fourth evaluation as to whether the second value equals the point at infinity and the returning step may comprise returning the second value only if additionally to the said conditions the fourth evaluation is false.

The elliptic curve may be defined by $y^2 = x^3 + ax + b$, where x and y are the coordinates of a point and a and b are integers.

The coordinates representing the first point may be s and t respectively and the step of making a first evaluation as to whether the first value is a singular point with respect to the elliptic curve may comprise evaluating whether $3s^2 + a = 0$.

The device may be a Bluetooth communication device. The mechanism may be the Bluetooth secure simple pairing protocol.

According to a second aspect of the present disclosure, there is provided a method for implementing an elliptic curve security mechanism by means of a device having a private key k, successful operation of which involves: (a) receiving a first value P, (b) computing a second value as the scalar multiplication of the first value with the private key of the device and (c) returning that second value kP; the mechanism being such that the first value defines a pair of coordinates representing the first point P and the second value defines a pair of coordinates representing the second point kP and being such that the first value is valid only if it lies on an elliptic curve of predefined form; the method comprising: receiving data as the first value; making a first evaluation as to whether the first value is a singular point with respect to the elliptic curve; computing the second value as the scalar multiplication of the first value with the private key of the device; making a second evaluation as to whether the second value lies on the elliptic curve; and returning the second value only if the first evaluation is false and the second evaluation is true.

A device that implements the BT-SSP protocol can use the mechanism described below to protect against the invalid curve attack. Instead of checking that the public key that is supplied to it is on the valid elliptic curve, it checks that the value computed as a function of the supplied public key passes certain validity criteria.

As indicated above, the elliptic curve E used in the Bluetooth protocol can be expressed as E=(a,b,p,r). The curve is defined over the integers modulo p (which will be denoted Zp herein) with r points on the curve, the points being given by the equation $y2 = x3 + ax + b$.

Let P=(s,t) be a an element in Zp×Zp. P thus represents a point having coordinates that both lie in the set Zp. In order for P to be a point that will allow the invalid curve attack to work if used as the bogus public key, this P has to be chosen to be:

1. a point of small order: i.e. a small n such that nP=O, for positive n; and
2. a point that also lies on a different curve E'=(a,b',p,r') that has the same coefficient a but a different coefficient b'. The reason behind this is to engineer that addition on E and E' is defined by identical formulas. The nature of the elliptic curve equation that defines the relationship between x, y, a and b means that addition only depends on the coordinates of the point (i.e. on x, y) and on a, but is independent of b (or b'). This has implications when the invalid curve attack comes to the step of deriving the attacked device's private key.

Given the equation that defines the relationship between x, y, a and b, E and E' only intersect in O (the point at infinity) if and only if b≠b'.

The present mechanism for implementing elliptic curve point addition and doubling will now be described.

Upon receiving P from an inquirer as the public key on which to generate a DHKey kP by scalar multiplication with the private key k according to the Bluetooth BT-SSP ECDH protocol, the recipient performs the following steps with a view to returning kP to the inquirer. It should be noted that these steps do not involve processing P to check that it lies on a valid curve.

Step 1

P has been defined as P=(s, t). The recipient calculates $(3s2+a)/2t$. If either the numerator (3s2+a) or the denominator (2t) is zero, which would indicate that P is a so-called singular point, then the process of returning a DHKey in response to P is abandoned.

If step 1 is completed without abandonment then the recipient proceeds with step 2.

Step 2

The recipient chooses a value k at random to act as its private key. In practice the value k could be generated by a pseudo-random algorithm of suitable quality. Once chosen, the same key may be used in subsequent protocols to save time.

Then the recipient calculates kP, which is the value that it is supposed to return to the inquirer according to the ECDH protocol.

Step 3

If k happens to have been chosen with the result that kP equals O then kP is not usable, because this result would imply that the order of P is a divisor of k. The recipient therefore checks whether kP=O. If kP=O then the process of returning a DHKey in response to P could be abandoned, or the recipient could return to step 2 a limited number of times (e.g. once) for a particular P. Alternatively, the test of step 3 could be omitted since if kP=O step 4 will fail.

If step 3 is completed without abandonment then the recipient proceeds with step 4.

Step 4

The recipient verifies that kP is on the curve E. To do this it checks that the equation $y2=x3+ax+b$ can be satisfied, where x and y are the coordinates of kP and a and b are valid integers according to the ECDH protocol. If the coordinates x and y of kP are not valid then the process of returning a DHKey in response to P is abandoned.

Step 5

If step 4 is completed without abandonment then the recipient returns kP to the inquirer.

This approach does not involve checking directly whether the received value of P is on the elliptic curve. The reason why this approach is sound as a defense against the invalid curve attack is that irrespective of the received value of P, P will lie on E if and only if kP lies on E where k is a random integer prime to r such that kP≠O.

The recipient could optionally check whether P≠O at any point prior to step 5. If the recipient receives a value of P that happens to equal O and does not check whether P≠O, then it will return kP equal to O. If a fresh k were not generated at each iteration then it should be checked whether P=O or alternatively whether kP=O and if true then it could abandon the process.

Before performing step 1, it can be efficient to first check that s and t are in the range from 0 to p. If they are not, then the process of returning a DHKey in response to P can be abandoned and the subsequent steps can be omitted. This does not improve security, but it is an easily applied test that can improve efficiency by avoiding the need to perform the other steps of the algorithm if P is found invalid on this basis.

Hence, an efficient mechanism for computing kP based on a received P whilst defending against the invalid curve attack is:

1. Check that 0<s,t<p, and abandon if false
2. Check that 3s2+a≠0, and abandon if false
3. Look up the private key k in memory or generate a random value k as the private key
4. Calculate kP for that k
5. Check that kP lies on the curve E, and abandon if false
6. Return kP It will be apparent that the order of the steps could be varied provided that the value(s) needed as operand in each step is/are available at the outset of that step.

The sole figure shows a device suitable for implementing the approach described above. The device comprises a Bluetooth transceiver 1 connected to an antenna 2 and a functional circuit 3 which provides user-accessible functions of the device. The functional circuit 3 could, for example implement the functions of a mobile phone, an audio headset or a television. The Bluetooth transceiver 1 comprises a radio frequency front-end 4 and a baseband section 5. The baseband section comprises a microprocessor 6 which executes program code stored in non-volatile memory 7. The program code is configured to cause the microprocessor 6 to execute cryptographic functions of the Bluetooth protocol in the manner described above. In an alternative embodiment, the cryptographic functions could be executed in dedicated hardware.

The algorithms described above could also be used to provide additional protection in protocols that use ECDH or similar protocols for other security purposes, such as confidentiality. If the process described above does not reach its endpoint then it could be concluded that the device that provided the value P is not trustworthy. Following that conclusion the recipient device could avoid performing one or more other security exchanges with the device that provided P, in case performing such exchanges allowed the recipient device to be compromised. For example, the recipient device could avoid performing authentication and/or encryption negotiations with the device that provided P. The recipient device could store the identity of the device that provided P as being insecure, and could avoid potentially compromising exchanges with it in the future.

The algorithms described above are not limited to use in the Bluetooth ECDH protocol. They could be used in any cryptographic protocol that employs elliptic or equivalent curves in a similar way.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present disclosure may consist of any such individual feature or combination of features. In view of the foregoing description it will be evident to a person skilled in the art that various modifications may be made within the scope of the disclosure.

The invention claimed is:

1. A communication device configured to implement an elliptic curve security mechanism, the communication device having a private key, and the communication device comprising:

at least one processor configured to implement a method comprising:
receiving a first value representing a first pair of coordinates from another device;
making a first evaluation as to whether the first value is a singular point with respect to an elliptic curve of predefined form;
computing a second value defining a second pair of coordinates as the scalar multiplication of the first value with said private key;
making a second evaluation as to whether the second value lies on the elliptic curve of predefined form; and
returning the second value for use by the other device only if the first evaluation is false and the second evaluation is true so as to ensure that the second value is returned to the other device only if the first value lies on and is not a singular point of the elliptic curve of predefined form.

2. A communication device as claimed in claim 1, wherein the security mechanism is such that the elliptic curve is defined over the integers modulo a predetermined prime number, and the at least one processor is further configured to make a third evaluation as to whether both of the coordinates defined by the first value lie in the range from zero to the predetermined prime number, and the returning the second value comprises returning the second value only if additionally to the said conditions the third evaluation is true.

3. A communication device as claimed in claim 2, wherein the computing the second value comprises computing the second value as the scalar multiplication of the first value with said private key, where the coordinate calculations are modulo the predetermined prime number.

4. A communication device as claimed in claim 1, wherein the communication device is arranged to generate the private key randomly for use in conjunction with a single received first value.

5. A communication device as claimed in claim 1, wherein the at least one processor is further configured so as not to directly evaluate whether the received first value lies on the elliptic curve.

6. A communication device as claimed in claim 1, wherein the at least one processor is further configured to make a fourth evaluation as to whether the second value equals the point at infinity and the returning the second value comprises returning the second value only if additionally to the said conditions the fourth evaluation is false.

7. A communication device as claimed in claim 1, wherein the elliptic curve is defined by $y^2=x^3+ax+b$, where x and y are the coordinates of a point and a and b are integers.

8. A communication device as claimed in claim 7, wherein the coordinates representing the first value are s and t respectively and the making a first evaluation as to whether the first value is a singular point with respect to the elliptic curve comprises evaluating whether $3s^2+a=0$ and $t=0$.

9. A communication device as claimed in claim 1, wherein the communication device is a Bluetooth communication device.

10. A communication device as claimed in claim 9, wherein the mechanism is the Bluetooth secure simple pairing protocol.

11. A communication device as claimed in claim 1, the communication device configured to implement the elliptic curve security mechanism by an operation in which it: (a) receives the first value from the other device, the first value being a public key, (b) computes the second value as the scalar multiplication of the first value with its private key, and (c) returns that second value for use by the other device; the mechanism being such that the first value defines a pair of coordinates representing a first point and the second value defines a pair of coordinates representing a second point and being such that the first value is valid only if it lies on the elliptic curve of predefined form.

12. A method for implementing an elliptic curve security mechanism via a communication device having a private key, method comprising:
using at least one processor to perform the following:
receiving a first value representing a first pair of coordinates from another device;
making a first evaluation as to whether the first value is a singular point with respect to an elliptic curve of predefined form;
computing a second value defining a second pair of coordinates as the scalar multiplication of the first value with said private key;
making a second evaluation as to whether the second value lies on the elliptic curve of predefined form; and
returning the second value for use by the other device only if the first evaluation is false and the second evaluation is true so as to ensure that the second value is returned to the other device only if the first value lies on and is not a singular point of the elliptic curve of predefined form.

13. A method as claimed in claim 11, the method for implementing the elliptic curve security mechanism for which operation involves: (a) receiving the first value, the first value being a public key, (b) computing the second value as the scalar multiplication of the first value with the private key of the communication device, and (c) returning that second value; the mechanism being such that the first value defines a pair of coordinates representing a first point and the second value defines a pair of coordinates representing a second point and being such that the first value is valid only if it lies on the elliptic curve of predefined form.

\* \* \* \* \*